United States Patent Office 2,723,885
Patented Nov. 15, 1955

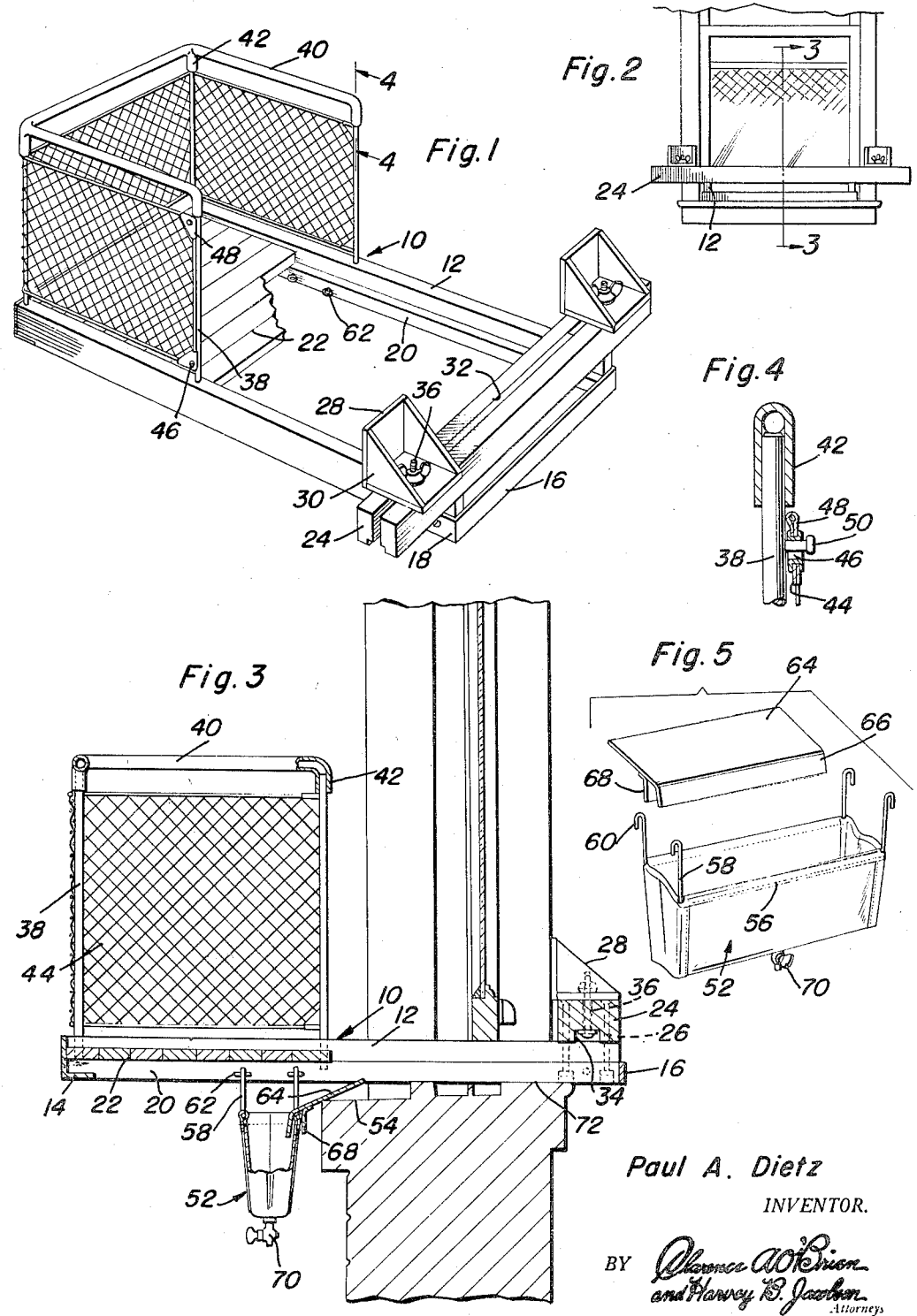

2,723,885
WINDOW CLEANING PLATFORM
Paul A. Dietz, Joplin, Mo.

Application September 17, 1951, Serial No. 246,915

1 Claim. (Cl. 304—24)

This invention relates to a safety guard window cleaner and particularly to novel and useful improvements in window platforms or seats.

An important object of this invention is to provide a window platform which is of simple and sturdy construction, and which may be readily mounted on a window frame without resort to anchorage facilities other than those provided on the window platform.

Another object of this invention is to prevent the obnoxious dripping of window cleaning fluid from the window ledge during the window cleaning operation.

An important feature of the invention resides in the provision of a window cleaning platform including a pair of spaced rails having a seat on one end thereof and a cross member on the opposite ends of the rails with a pair of angulated window frame engaging members mounted on the cross member for adjustment longitudinally thereof, whereby the seat is adapted for mounting on differently dimensioned windows.

Another feature of this invention resides in the provision of a window seat including a pair of side rails and a platform adjacent one end thereof, together with a fluid receptacle mounted below the platform and carried by the side rails, and a drip plate supported on one edge of the receptacle and adapted to rest on the window ledge to drain the window cleaning fluid from the ledge to the receptacle.

These, together with various ancillary objects and features are attained by the instant device, a preferred embodiment of which is illustrated in the accompanying drawings, wherein:

Figure 1 is a perspective elevational view of the window seat, parts being broken away to show details of construction;

Figure 2 is a fragmentary side elevational view of the inside of a window frame having the window seat mounted thereon;

Figure 3 is a vertical sectional view, taken on the plane of the section line 3—3 of Figure 2;

Figure 4 is a fragmentary sectional view, taken on the plane of the section line 4—4 of Figure 1; and Figure 5 is assembly view of the drip pan.

Reference is now made more specifically to the accompanying drawings wherein like numerals designate similar parts throughout the various views and in which the window seat is designated generally by the numeral 10.

The seat 10 includes a pair of side rails 12 which are secured together at one end by an angle member 14, and at the other end by a strap 16 having angulated ends 18. Strips 20 are secured to the registering faces of the side rails, below the upper edges thereof, and a seat or platform 22 is removably disposed on the strips between the side rails. In order to mount the window seat in a window frame, there is provided a cross member 24 which is fastened to the ends of the rails remote from the seats by fasteners 26. A pair of angulated frame engaging members 28, suitably braced by gussets 30, are each mounted on the cross member for adjustment longitudinally thereof, and for this purpose, the cross member is provided with a longitudinally extending slot 32, which is enlarged, as at 34, for the reception of headed bolts 36, by means of which the frame engaging members are adjustably attached to the cross member.

A protective fence is provided around the platform 22, which fence includes standards 38, the lower ends of which are inserted or otherwise suitably fastened to the side rails 12, the upper ends of the standards being braced by a frame 40 having depending standard receiving sockets 42 thereon. A section of screen 44 having openings 46 in the reinforced corners 48 thereof, is disposed about the standards 30 and secured thereto by pins 50 (see Figure 4).

An elongated receptacle 52 is provided to prevent the cleaning fluid which runs off the windows from dripping off the window ledge 54. The receptacle is preferably formed of a flexible waterproof material, such as plastic or canvas, the upper edges of the receptacle being seamed, as at 56, for the reception of the web portion of the U-shaped hanger members 58. The legs of the hanger members terminate in hooks 60 which are received in eyes 62 on the strips 20, below the platform 22. A drip plate 64 having an angulated end portion 66 and an ear 68 secured thereto, in spaced relation to the end portion 66, is provided for guiding the water from the window ledge 54, into the receptacle 52, from which it may be drained off, at will, at petcock 70 on the bottom thereof.

In use, the window platform is positioned so that the rails 12 rest upon the window sill 72, adjacent the sides of the window, and the angulated members 28 are adjusted on the cross members so as to engage the inside window frame trim, as is best shown in Figures 2 and 3. The platform 22 may then be moved to the right, as viewed in Figure 3, to facilitate attaching the hook ends of the hanger members in the eyes 62. The platform is then returned to its proper position, shown in Figures 1 and 3, and the drip plate mounted on the edge of the receptacle to span the space between the receptacle and the ledge.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

Having described the invention, what is claimed as new is:

A window platform to be used in washing the outside of windows comprising a pair of spaced, parallel rails, means for securing said rails horizontally in a window, the inner edges of the rails resting on the window ledge, a platform mounted on said rails, a drip receptacle removably suspended from said rails beneath the platform to receive the drip from the window, and an inclined drip plate removably mounted on the receptacle extending the width of the window and projecting from the receptacle toward the window ledge, and means mounting said platform for sliding movement longitudinally on said rails for providing access to said receptacle.

References Cited in the file of this patent
UNITED STATES PATENTS

| Number | Name | Date |
| --- | --- | --- |
| 175,245 | Haight | Mar. 28, 1876 |
| 215,016 | Mettee | May 6, 1879 |
| 565,764 | Lynch | Aug. 11, 1896 |
| 676,625 | Hayden | June 18, 1901 |
| 764,463 | Harrison | July 5, 1904 |
| 1,145,263 | Persoons | July 6, 1915 |
| 1,184,898 | Thorn | May 30, 1916 |
| 1,336,672 | Bank | Apr. 13, 1920 |
| 1,658,670 | Corbett | Feb. 7, 1928 |
| 1,844,872 | Shipman | Feb. 9, 1932 |
| 1,932,707 | Oberti | Oct. 31, 1933 |
| 2,591,467 | Rodefer | Apr. 1, 1952 |

FOREIGN PATENTS

| | | |
| --- | --- | --- |
| 6,563 | Great Britain | 1892 |